United States Patent [19]

Huber et al.

[11] Patent Number: 4,773,486

[45] Date of Patent: Sep. 27, 1988

[54] DRIVEN TINE WHEEL TYPE AERATOR HAVING IMPROVED TINE GEOMETRY

[75] Inventors: Donald J. Huber, Lincoln, Nebr.; Paul F. Santini, Fort Myers Beach, Fla.

[73] Assignee: Outboard Marine Corporation, Waukegan, Ill.

[21] Appl. No.: 898,053

[22] Filed: Aug. 19, 1986

[51] Int. Cl.⁴ ............................................. A01B 45/02
[52] U.S. Cl. ........................................ 172/22; 172/545
[58] Field of Search ................... 172/21, 22, 545, 547, 172/548, 556, 540, 549

[56] References Cited

U.S. PATENT DOCUMENTS

| | | | |
|---|---|---|---|
| 797,443 | 8/1905 | Lindgren | 172/545 |
| 895,731 | 8/1908 | Dearing | 172/545 |
| 1,257,818 | 2/1918 | Dixon | 172/554 |
| 1,704,986 | 3/1929 | Marcy | 172/21 |
| 1,912,580 | 6/1933 | Heinemann | 172/554 |
| 2,205,997 | 6/1940 | Wallace et al. | 172/21 |
| 2,314,035 | 3/1943 | Dontje | 172/21 |
| 2,325,997 | 8/1943 | Kelly | 172/545 |
| 2,580,236 | 12/1951 | Mascaro | 172/22 |
| 2,700,926 | 2/1955 | Goit | 172/22 |
| 2,778,291 | 1/1957 | Kerns | 172/21 |
| 2,866,422 | 12/1958 | Colson | 111/6 |
| 3,011,563 | 12/1961 | Ceretti et al. | 172/22 |
| 3,140,677 | 7/1964 | Fraser | 111/8 |
| 3,148,737 | 9/1964 | Lunsford | 172/21 |
| 3,393,751 | 7/1968 | Mascaro | 172/21 |
| 3,528,508 | 9/1970 | Stevenson | 172/554 |
| 3,542,139 | 11/1970 | Mowbray | 172/540 |
| 3,993,143 | 11/1976 | Moreland, Jr. | 172/22 |
| 4,020,907 | 5/1977 | Luck | 172/554 |
| 4,336,760 | 6/1982 | Cohen | 111/11 |
| 4,434,856 | 3/1984 | Crane | 172/256 |
| 4,550,783 | 11/1985 | Hansen | 172/21 |

FOREIGN PATENT DOCUMENTS 651522 1/1964 Belgium.

Primary Examiner—Richard J. Johnson
Attorney, Agent, or Firm—Welsh & Katz

[57] ABSTRACT

A core-type walk-behind aerator includes a chassis movable along a turf surface and having a tine wheel assembly rotatable about an axis transverse to the direction of movement of the aerator. The tine wheel assembly is positively driven by power means and carries a plurality of tubular coring tines selectively positioned about the periphery of the tine wheel such that the tines define forward rake angles. The number of tines, their rake angles, the diameter of the tine wheel assembly and weight of the aerator acting on the tine wheel assembly have predetermined relation so as to effect substantially axial penetration of said tines into the turf and substantially axial withdrawal of the tines from the same surface openings made upon penetration as the tine wheel undergoes rotation about an instant rotational center spaced below the surface of the turf. The tines continually compress the soil so as to remove cores of thatch and subsoil without lifting the turf peripherally of the openings made by the tines. In the illustrated embodiment, each tine has a forward rake angle of approximately 41°.

11 Claims, 3 Drawing Sheets

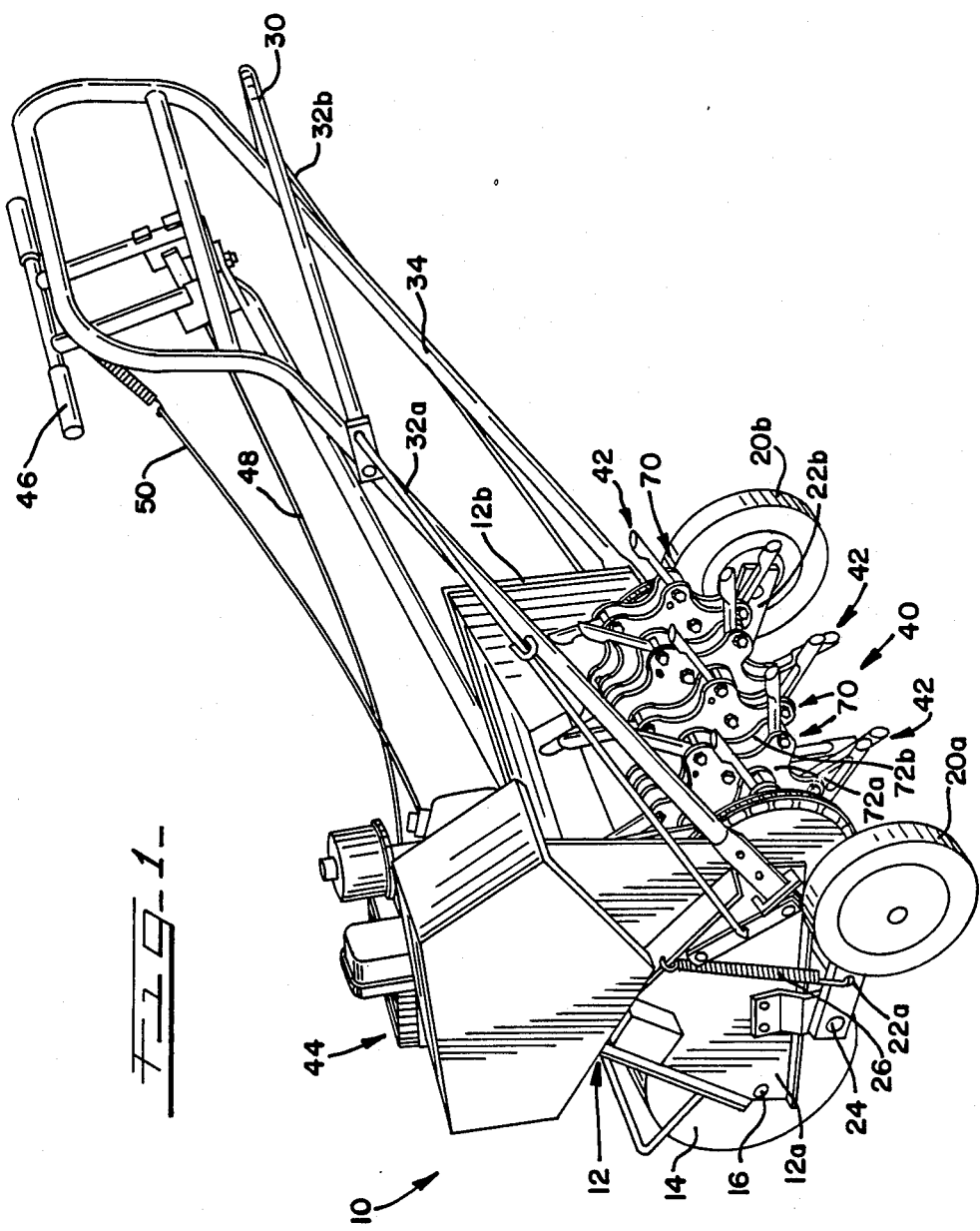

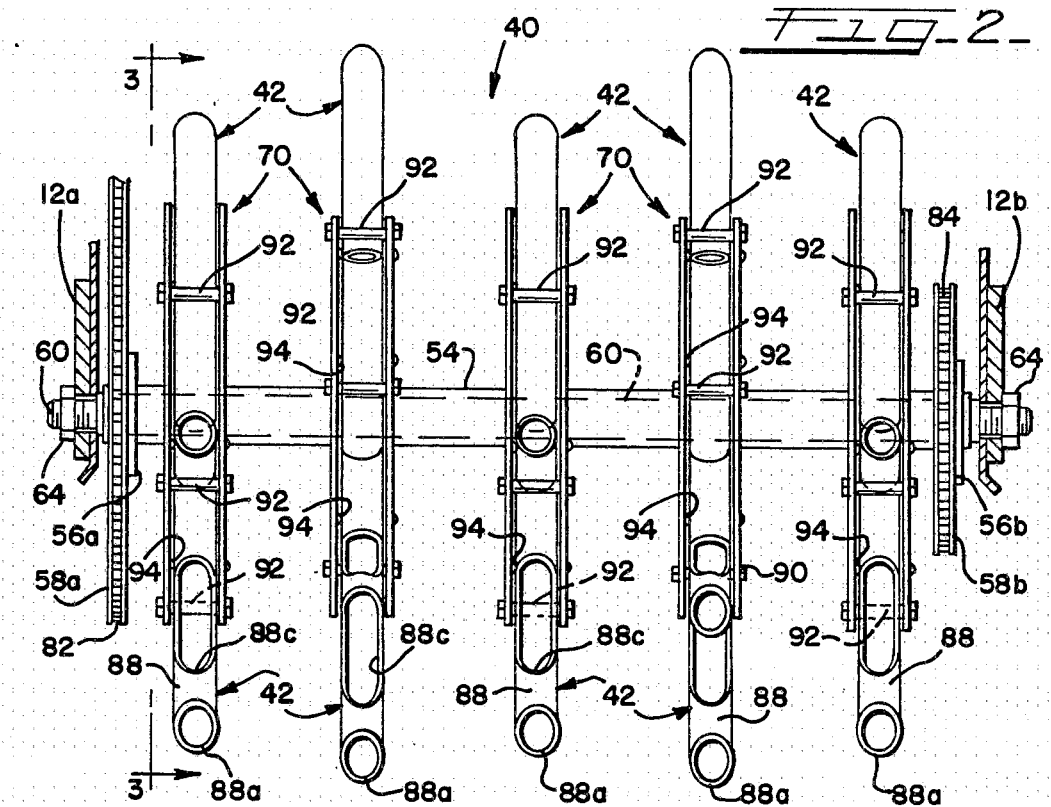
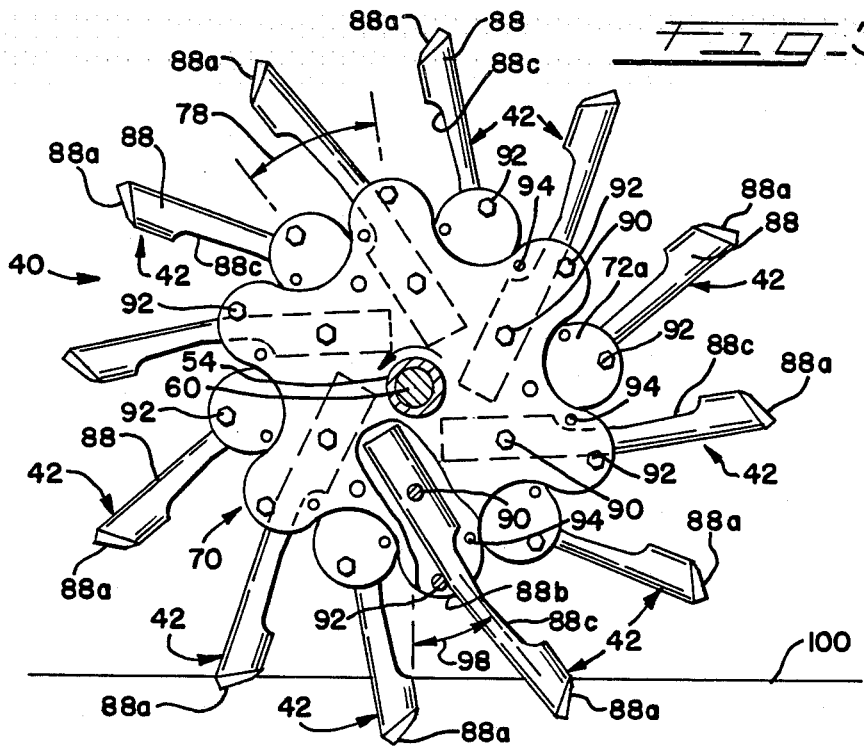

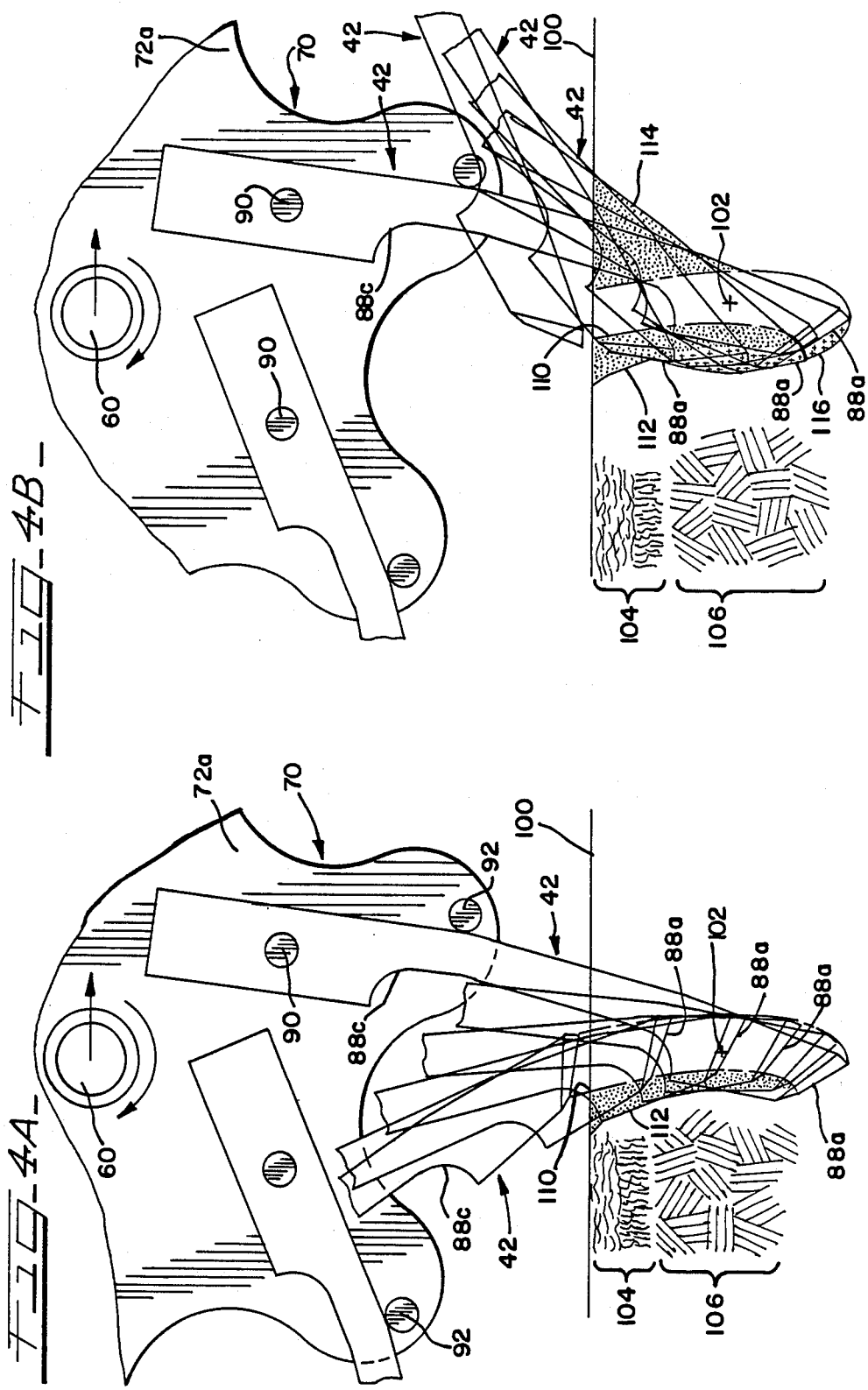

DRIVEN TINE WHEEL TYPE AERATOR HAVING IMPROVED TINE GEOMETRY

BACKGROUND OF THE INVENTION

The present invention relates generally to core-type aerators, and more particularly to a driven tine wheel core-type aerator having novel tine geometry.

It is common practice in the treating of turf, such as on golf courses and similar groomed lawn areas, to aerate the turf by forming a pattern of generally cylindrical shaped holes in the turf which enable moisture and fertilizers and the like to more readily reach and stimulate root growth, thus leading to a heartier turf. The aeration holes are conventionally formed by apparatus, termed aerators, which include a plurality of coring tines operative to penetrate the soil in a manner to remove generally cylindrical cores or plugs of turf. In one type of aerator for effecting core aerification, the tines are mounted in generally radial relation about a tine wheel which is adapted to rotate about an axis transverse to the direction of movement of the aerator. The tines are conventionally mounted in circumferentially spaced rows such that the tines sequentially penetrate the soil on rotation of the tine wheel to create a pattern of aeration holes.

Aerators of the rotary tine wheel type are generally further classified as being either towed type aerators wherein the tine wheels are supported for substantially free rotation about their longitudinal axes and are caused to rotate in response to towing of the aerator by a tractor or the like through a drawbar or three-point hitch arrangement, or driven tine wheel type aerators wherein the tine wheel has positive driven relation with motor means or the like carried by the aerator and operative when energized to cause the tine wheel to rotate so as to propel the aerator while simultaneously effecting tine penetration to aerate the underlying turf. Significant differences exist between these two types of aerators which influence the specific tine geometry best suited for each type aerator.

For example, the forces delivered to the soil through the tines, termed the tine penetration forces, are different for towed and driven tine wheel aerators. This difference dictates the need for different tine angles between towed and driven tine wheels. By tine angle is meant the angular relation between the longitudinal axis of the turf penetrating end of the tine and a radius extending from the rotational axis of the tine wheel and generally intersecting the point at which the tine extends from the tine wheel periphery. This relation may also be termed the tine orientation geometry. For a towed type tine wheel, two forces must be supported by the soil; a component of the drawbar pulling force, and the weight of the machine. A driven type tine wheel also has two forces that must be supported by the soil; the weight of the machine and the resultant force of the driving torque acting on the tine wheel. This resultant driving torque force is generally larger than the drawbar component force of a towed type tine wheel so that the weight required to effect the same aerating core depth is generally less for a driven tine wheel type aerator. The differences in tine penetration forces between towed and driven tine wheel type aerators also change the instant center of rotation, or true rolling radius, of the tine wheel; specifically, the instant center of the driven tine wheel tends to be deeper in the soil than for a towed type tine wheel. This difference necessitates different tine angles or tine orientation geometry for the driven type tine wheels to provide optimum aerating performance.

A desirable objective of rotary tine wheel type aerators, and particularly aerators employed to aerate golf course greens or other areas where relatively even surfaces are critical, is to form the aerification holes with minimum disturbance or lifting of the turf peripherally about the hole openings.

An example of a towed type rotary tine wheel aerator is disclosed in U.S. Pat. No. 2,580,236 to Mascaro. The Mascaro patent recognizes the problem often encountered in aerating turf having a relatively shallow grass root structure; that is, the tendency of the aerating tines to tear loose and raise the surface layer of turf adjacent the formed aerating holes. Mascaro attempts to overcome this problem by utilizing coring tines or spoons which after initial entry into the turf at generally right angles to the turf surface move progressively rearwardly to undercut the subsoil in an arcuate sweeping action about a center located substantially at the entrance of the tine into the turf. This action is believed to create an uplifting force on the turf overlying the arcuate sweep of the tine, thus creating, rather than solving, the very problem recognized by Mascaro. Mascaro suggests overcoming the problem of uplifting of the turf surface by providing bearing elements or strips which engage the upper surface of the turf between the coring tines or spoons.

SUMMARY OF THE INVENTION

One of the primary objects of the present invention is to provide a driven tine wheel core-type aerator having novel tine geometry which provides improved aeration performance through substantially improved core removal with minimal turf damage.

A more particular object of the present invention is to provide a driven tine wheel core-type aerator having a driven tine wheel assembly disposed transverse to the direction of movement of the aerator and having a plurality of tubular open ended coring tines carried thereon at tine rake angles which provide substantially improved core removal with minimal turf damage while providing optimum aerification of the underlying turf.

A feature of the driven tine wheel core-type aerator in accordance with one embodiment of the invention lies in mounting the tines on the tine wheel assembly so as to establish forward rake angles of approximately 41° and wherein the tines are maintained in fixed relation to the tine wheel assembly throughout rotation thereof.

A further feature of the driven tine wheel core-type aerator in accordance with the invention lies in providing a tine wheel assembly which is positively connected to a power drive source carried on the aerator and which includes a plurality of axially spaced pairs of tine support plates, each pair of plates carrying substantially equidistantly circumferentially spaced tubular coring tines disposed at forward rake angles of approximately 41°.

In carrying out the invention, there is provided a core-type aerator including a chassis to which are mounted a forward ballast wheel, a tine wheel assembly for rotation about an axis generally transverse to the direction of movement of the aerator, and rear support wheels enabling raising of the tine wheel assembly for transport and lowering for aerating. Power means carried by the chassis are operatively associated with the tine wheel assembly to enable driven rotation thereof. The tine wheel assembly includes a plurality of tubular coring tines affixed about its periphery. Each tine has an open penetrating end defining a predetermined forward rake angle. The number of tines, their rake angles, the diameter of the tine wheel assembly and the weight of the aerator acting on the tines have predetermined relation so as to effect substantially axial penetratin of the tines into the turf and substantially axial withdrawal of the tines from the same surface openings made upon penetration as the tine wheel undergoes rotation about an instant rotational center continually spaced below the surface of the turf. Each tine is operative during a coring cycle to remove a core of thatch and subsoil while continually compressing the adjacent thatch and root zone so as to prevent lifting of the turf peripherally of the surface opening.

Further objects, features and advantages of the invention, together with the organization and manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 1 is a perspective view of a walk-behind driven tine wheel core-type aerator constructed in accordance with the present invention;

FIG. 2 is a fragmentary rear elevational view illustrating the tine wheel assemby employed in the aerator of FIG. 1;

FIG. 3 is a sectional view taken substantially along line 3—3 FIG. 2, portions being broken away for purposes of clarity; and FIGS. 4A and 4B schematically illustrate the action of a coring tine during a turf coring cycle in accordance with the invention.

DESCRIPTION OF PREFERRED EMBODIMENT

Referring now to the drawings, and in particular to FIG. 1, an aerator of the walk-behind driven tine wheel type for providing core-type aerification of turf in accordance with the present invention is indicated generally at 10. The aerator 10, which may alternatively be termed an aerating apparatus or machine, includes a main frame or chassis, indicated generally at 12, on which is mounted a generally cylindrical hollow drum 14, termed a ballast wheel, for rotation about an axis 16 transverse to the direction of movement of the aerator during operation. A pair of support wheels 20a and 20b are mounted on the chassis 12 through corresponding support arms 22a,b which are pivotal about a common pivot axis 24 parallel to the rotational axis 16 of the drum 14. The wheels 20a,b and associated support arms 22a,b are biased upwardly relative to the chassis 12 through tension springs, one of which is illustrated at 26. The wheels 20a,b have operative association with a control handle 30 through control rods 32a and 32b, respectively, so as to enable selective raising and lowering of the wheels 20a,b relative to the chassis 12. In this manner, the chassis may be raised and lowered about the rotational axis 16 relative to a turf or soil surface over which the aerator is to operate. The control handle 30 is pivotably mounted to a main control handle 34 having its lower ends affixed to the chassis 12. The support wheels 20a,b along with their associated support arms 22a,b and interconnecting linkage (not shown) to the control rods 32a,b and control handle 30 define rear support means for the chassis 12 to facilitate movement of the chassis between a lowered operating position and a raised transport position in a known manner.

The aerator 10 inludes aerating means in the form of a tine wheel assembly, indicated generally at 40, which is mounted on the chassis 12 for rotation about a fixed rotational axis parallel to the drum rotational axis 16. As will be described more fully hereinbelow, the tine wheel assembly 40, which may alternatively be termed a tine support reel, includes a plurality of selectively positioned tubular coring tines, each of which is indicated at 42, and is positively interconnected to power drive means in the form of a suitable internal combustion engine 44. The tine wheel assembly 40 is interconnected to the engine 44 through clutch means (not shown) in a conventional manner so as to enable an operator to control both engine speed and driving rotation of the tine wheel assembly 40 through a throttle-clutch control handle 46 having interconnection to the engine and clutch through a throttle control cable 48 and a clutch control cable 50 in a known manner.

The aerator 10 as thus far described provides a self-propelled, walk-behind roll-type aerator for coretype aerification. In operation, the drum 14 is filed with liquid such as water to counterbalance the rotational torque applied to the chassis upon driving rotation of the tine wheel assembly. With the support wheels 20 in their lowered positions through manipulation of the control handle 30 to raise the tine wheel assembly 40 above the ground surface, the operator may move the aerator to a desired location. When it is desired to begin aerification of the underlying turf, the operator raises the support wheels 20 through the control handle 30 to lower the tines 42 to ground engaging position after which the control handle 46 is manipulated to drive the tine wheel assembly and effect self-propelled movement of the aerator while the operator grasps and presses downwardly on the upper end of the main control handle 34. The support wheels 20 may be employed to limit downward movement of the tine wheel assembly in a known manner. This operation is similar to operation of the self-propelled aerating device disclosed in U.S. Pat. No. 4,550,783 which is incorporated herein by reference for its disclosure of structural details, other than its tine wheel, which may be incorporated into the aerator 10 if desired. Frame means (not shown) may be provided on the chassis 12 to support additional weights as desired.

Referring now to FIGS. 2 and 3, taken in conjunction with FIG. 1, the tine wheel assembly 40 includes a tubular support shaft 54 having annular flange plates 56a and 56b fixed to its opposite ends. The flange plates 56a and 56b serve as mounting flanges for associated sprockets 58a and 58b, respectively, which may be affixed to the mounting flanges by screws or other suitable means. The tubular support shaft 54 is supported by and rotatable about a support shaft 60 which has threaded opposite ends received through suitable aligned openings in laterally spaced sidewalls 12a and 12b of the chassis 12. Nuts 64 retain the support shaft 60 in mounted relation to the chassis walls 12a,b so as to define a rotational axis for the tine wheel assembly 40 parallel to the rotational axis 16 of the drum 14.

The tubular support shaft 54 serves to support a plurality of axially spaced tine mounting wheels each of which is indicated generally at 70. Each tine mounting wheel 70 includes a pair of substantially identically shaped discs or plates 72a and 72b which are generally star shape or scalloped about their peripheral edges as viewed in side profile in FIG. 3. The plates 72a,b of each tine mounting wheel 70 have axially aligned circular openings formed at their geometric centers which are sized to enable the corresponding tine mounting wheel to be mounted on the tubular support shaft 54 and selectively spaced along its length. The pairs of plates 72a,b are fixed in spaced relation on the support shaft 54 by welding so that the plates lie in parallel planes transverse to the axis of shaft 54. The plates 72a,b of each tine mounting wheel 70 have their scalloped outer edges oriented in identical angular relation relative to their centers when viewed in side profile. In the illustrated embodiment, five tine mounting wheels 70 are mounted on the tubular support shaft 54 in equidistant axially spaced relation. The tine mounting wheels 70 are rotationally oriented relative to the support shaft 54 such that the scalloped peripheral edges of each tine mounting wheel 70 are advanced approximately 30° out of alignment with the scalloped edges of the next adjacent tine wheels, as indicated by the angular relationship indicated at 78 in FIG. 3. As will be described, the coring tines 42 are also angularly displaced about the axis of shaft 54 by arcuate angles of approximately 30° as considered between adjacent tine mounting wheels 70.

The sprocket 58a, which may be termed the tine wheel assembly drive sprocket, is connected through a roller chain 82 to a drive sprocket (not shown) which in turn is selectively driven by the engine 44 through a suitable clutch arrangement such as disclosed in the aforementioned U.S. Pat. No. 4,550,783. Selective driving rotation of the support shaft 54 and associated tine mounting wheels 70 may thus be effected. The sprocket 58b is preferably interconnected to the drum or ballast wheel 14 through a suitable roller chain 84 so as to effect driving rotation of the drum 14 upon rotation of the tine wheel assembly 40.

In accordance with the present invention, each tine mounting wheel 70 supports or carries six coring tines 42 in equidistantly circumferentially spaced relation about the rotational axis of the tine mounting wheel. Each coring tine 42 includes a generally cylindrical tubular body 88 having an outer open penetrating end defined by a tapered or sharpened cutting edge 88a which lies in a plane inclined to the longitudinal axis of the tine. Each coring tine 42 is mounted to and between the plates 72a,b of the corresponding tine mounting wheel through a transverse bolt 90 such that a length of the tine equal to approximately twice the desired depth of tine penetration extends outwardly from a generally cylindrical imaginary envelope tangent to the outermost edge surfaces of the scalloped wheel plates. As illustrated in FIG. 3, each tine 52 is slightly angled at approximately its midlength, such as at 88b, such that the longitudinal axis of the portion of the tine extending outwardly from the associated wheel plates 72a,b forms an included angle of approximately 8° with the longitudinal axis of the remaining length of the tine, as considered in the plane of FIG. 3. The leading surface of each tine body 88, considered as the leading surface during rotation of the tine wheel assembly in a counterclockwise direction as viewed in FIG. 3, is cut away or fluted at 88c to facilitate discharge of turf cores removed during aeration.

The mounting plates 72a,b of each tine mounting wheel 70 are spaced apart a distance sufficient to slidingly receive the six tines 42 therebetween and enable insertion of a mounting bolt 90 through aligned openings in the mounting plates and associated tines. The angular relation of the portion of each coring tine 42 extending outwardly from its associated tine wheel 70 relative to the rotational axis 60 of the tine wheel assembly is established by a backup bolt 92 which is received through aligned openings in the wheel plates 72a,b so as to abut the outer peripheral surface of the associated tine. Each bolt 92 is drawn tight enough to squeeze the wheel plates against the tines and thereby maintain the tines in relative fixed positions. To further ensure that the tines 42 do not pivot significantly from their angular positions as established by the mounting bolts 90 and backup bolts 92, at least one of the tine wheel plates 72a,b of each tine mounting wheel 70 has a tab 94 formed adjacent each tine so as to extend between the plates sufficiently to engage the associated tine and prevent any significant pivotal movement thereof away from its corresponding backup bolt.

In the illustrated embodiment, the five tine mounting wheels 70 are preferably mounted along the mounting shaft 54 so as to establish circular rows of ¾ inch diameter tines 42 spaced approximately 3.75 inches apart. The outer diameter of the tine wheel assembly 40, considered as the diameter of a cylindrical envelope engaging the outer tips of the tines 42, is approximately 16 inches, while the diameter of a circular center line passing through the centers of the back-up bolts 92 is approximately 8.4 inches. With the adjacent tine mounting wheels 70 rotationally staggered by approximately 30°, twelve longitudinal rows of tines are established circumferentially about the support shaft 54 with each row of two tines alternating with rows of three tines. In this manner, as the tine wheel assembly 40 traverses a turf surface, it forms parallel rows of aeration holes spaced approximately 3¾" apart while the individual holes in each row are spaced approximately 7" apart.

In accordance with the invention, the longitudinal axis of the outwardly extending penetrating end of each coring tine 42 defines a predetermined forward rake angle with a radius drawn from the axis of rotation 60 of the tine wheel assembly and passing through the center of the corresponding tine mounting bolt 90. In the illustrated embodiment, each tine 42 is oriented to define a forward rake angle of approximately 41° as represented by the double arrow-headed line 98 in FIG. 3. As used herein, the term "approximately 41°" includes an angular range of between approximately 39°–43°, but preferably 41°.

The number of tines 42, their respective rake angles 98, the diameter of the tine wheel assembly 40 and the weight of the aerator acting downwardly on the tine wheel have predetermined relation so as to effect substantially axial penetration of the tines into a turf surface, as represented at 100 in FIGS. 3, 4A and 4B, and substantially axial withdrawal of the tines from the same surface openings formed during penetration. Such action is undertaken as the tine wheel assembly undergoes rotation in a clockwise rotational direction about its own axis 60, as considered in FIGS. 4A and 4B, and about an instantaneous rotational center, alternatively termed a rolling radius center, as indicated at 102 in FIGS. 4A and 4B, which is always spaced below the turf surface 100. As illustrated in FIGS. 4A and 4B, the makeup of the turf into which the aeration holes are formed generally includes an upper layer or zone 104 of spongy thatch and heavy roots, beneath which is a subsoil or dirt zone 106. Each of the coring tines 42 removes a generally cylindrical core of thatch and subsoil during a coring cycle while continually compressing the thatch and root zone immediately forwardly and rearwardly of the aeration hole.

FIG. 4A schematically illustrates a fragmentary portion of a tine 42 as it initially penetrates the soil surface to form a circular opening 110 and progressively moves downwardly through the thatch and root zone 104 into the subsoil zone 106. The weight of the aerator 10 is selected to cause the tines to penetrate to a maximum depth of approximately 2.75 inches which may be controlled by positioning of the support wheels 20a,b. As the tines in each longitudinal row progress to their maximum depths, the tine wheel assembly undergoes rotation or pivotal movement about the instant rotational center 102 which is located below the turf surface a distance equal to substantially one-half the penetration depth of the tines. After reaching maximum depth, the tines begin their withdrawal movement as illustrated in FIG. 4B. The tines are withdrawn from the same circular opening 110 in the turf surface while the tine wheel continues to rotate about an instant rotational center located below the turf surface 100 a distance equal to approximately one-half the instantaneous penetration depth of the tine.

An important feature of the aerator 10 is that the thatch and root zone 104 which is engaged by each tine during a coring cycle, and particularly the thatch and root zone immediately forwardly and rearwardly of the opening 110 and corresponding hole formed by the tine, is continually in downward compression. For example, the dotted area 112 represented in FIG. 4A by represents thatch and root zone and underlying subsoil compressed generally downwardly by engagement with the outer peripheral surface of a tine during penetration, while the dotted area 114 in FIG. 4B represents thatch and root zone and subsoil compressed generally downwardly by the tine during withdrawal. Any subsoil loosened by the cutting edge 88a of a tine during a coring cycle, as represented by the starred area 116 in FIG. 4B, generally will extend no higher than the interface of the thatch and root zone 104 with the subsoil zone 106 and remains in the hole created by the tine. The thatch and root zones compressed by the tines during a coring cycle are spongy and generally sufficiently resilient to restore themselves and minimize the resulting opening in the turf surface.

Thus, in accordance with the action of the tines 42 during a coring cycle, the thatch and root zone generally peripherally of each aerification hole formed in the turf is continually in compression such that the thatch and root zone is not subjected to any significant lifting action peripherally of the formed aerification hole opening 110. This is accomplished by correlating the relationship between the number of tines, their rake angles, the diameter of the tine wheel assembly and the weight of the aerator acting on the tines. As previously noted, by applying a driving torque to the tine wheel 40, the weight of the aerator necessary to achieve axial penetration of the tines 42 into the turf and axial withdrawal from the same turf surface openings while the tine wheel undergoes rotation about an instant rotational center 102 spaced below the surface 100 of the turf is significantly less than is necessary with towed type aerators.

While a preferred embodiment of the present invention has been illustrated and described, it will be understood that changes and modifications may be made therein without departing from the invention in its broader aspects. Various features of the invention are defined in the following claims.

What is claimed is:

1. In an aerator for use in core-type aerification of turf having an upper thatch and root zone and an underlying subsoil zone, said aerator including a chassis, means operatively associated with said chassis in a manner enabling movement along a turf surface, a tine wheel assembly carried by said chassis for rotation about an axis generally transverse to the direction of movement of the aerator during operation, and power means carried by said chassis and operatively associated with said tine wheel assembly so as to enable driven rotation thereof; the improvement wherein said driven tine wheel assembly includes a plurality of tubular coring tines affixed about the periphery of said wheel assembly in outwardly extending relation therefrom, each of said tines including an outer open ended tubular penetrating end having a longitudinal axis defining a predetermined forward rake angle, the number of said tines, their said rake angles, the diameter of said tine wheel assembly and the weight of said aerator having a predetermined relation so as to effect substantially axial penetration of said tines into the turf to a specified penetration depth and substantially axial withdrawal of said tines from the same surface openings made upon penetration, said predetermined relation causing said tine wheel to undergo rotation about an instant rotational center spaced below the surface of the turf and located a distance equal to approximately one-half the penetration depth of said tines, each of said tines being operative to remove a core of thatch and subsoil with the outer periphery of the tubular penetrating end effecting compression of the thatch and root zone peripherally of the core during entry of said penetrating end into the turf and removal therefrom so as to prevent lifting of the turf adjacent said opening.

2. An aerator as defined in claim 1 wherein said coring tines are affixed about said tine wheel assembly so as to define circumferentially spaced rows of tines.

3. An aerator as defined in claim 2 wherein said tine wheel assembly includes a plurality of tine mounting plates fixed in axially spaced relation along a support shaft so as to define pairs of parallel spaced mounting plates transverse to the axis of said support shaft, each pair of mounting plates having a plurality of said tubular tines mounted therebetween in equidistant circumferentially spaced relation about the axis of said support shaft.

4. An aerator as defined in claim 3 wherein each of said tines is mounted on a discrete support pin disposed between the corresponding pair of mounting plates, and including back-up means for each of said tines operable to maintain said predetermined forward rake angle for the corresponding tine relative to the rotational axis of said support shaft.

5. An aerator as defined in claim 3 wherein said pairs of mounting plates are mounted on said support shaft such that each pair of mounting plates is angularly spaced about the axis of said support shaft a predetermined arcuate distance from the next adjacent pairs of mounting plates.

6. An aerator as defined in claim 1 wherein said open ended penetrating ends of said tines are defined by sharpened cutting edges each of which lies in an inclined plane relative to the longitudinal axis of the corresponding tine.

7. An aerator as defined in claim 1 wherein each of said tines has a forward rake angle in the range of approximately 39°-43°.

8. An aerator as defined in claim 7 wherein each of said tines has a forward rake angle of 41°.

9. An aerator as defined in claim 2 wherein said support shaft has a drive sprocket affixed thereto, and including means operatively connecting said drive sprocket to said power means so as to enable powered rotation of said tine wheel assembly whereby to effect self-propelled movement of the aerator.

10. In an aerator for use in core-type aerification of turf having an upper thatch and root zone and an underlying subsoil zone, said aerator including a chassis, means operatively associated with said chassis in a manner enabling movement along a turf surface, a tine wheel assembly carried by said chassis for rotation about an axis generally transverse to the direction of movement of the aerator during operation, and power means carried by said chassis and operatively associated with said tine wheel assembly so as to enable driven rotation thereof; the improvement wherein said driven tine wheel assembly includes a plurality of tubular coring tines affixed about the periphery of said wheel assembly in outwardly extending relation therefrom, each of said tines including an outer open ended tubular penetrating end having a longitudinal axis defining a predetermined forward rake angle of 41°, the number of said tines, their said rake angles, the diameter of said tine wheel assembly and the weight of said aerator having a predetermined relation so as to effect substantially axial penetration of said tines into the turf and substantially axial withdrawal of said tines from the same surface openings made upon penetration, said predetermined relation causing said tine wheel to undergo rotation about an instant rotational center spaced below the surface of the turf, each of said tines being operative to remove a core of thatch and subsoil with the outer periphery of the tubular penetrating end effecting compression of the thatch and root zone peripherally of the core during entry of said penetrating end into the turf and removal therefrom so as to prevent lifting of the turf adjacent said opening.

11. In an aerator for use in core-type aerification of turf having an upper thatch and root zone and an underlying subsoil zone, said aerator including a chassis, means operatively associated with said chassis in a manner enabling movement along a turf surface, a tine wheel assembly carried by said chassis for rotation about an axis generally transverse to the direction of movement of the aerator during operation, and power means carried by said chassis and operatively associated with said tine wheel assembly so as to enable driven rotation thereof; the improvement wherein said driven tine wheel assembly includes a plurality of tubular coring tines affixed about the periphery of said wheel assembly in outwardly extending relation therefrom, each of said tines including an outer open ended tubular penetrating end having a longitudinal axis defining a predetermined forward rake angle of approximately 41°, and a tapered cutting edge lying in an inclined plane relative to the longitudinal axis of the corresponding tine, the number of said tines, their said rake angles, the diameter of said tine wheel assembly and the weight of said aerator having a predetermined relation so as to effect substantially axial penetration of said tines into the turf and substantially axial withdrawal of said tines from the same surface openings made upon penetration, said predetermined relation causing said tine wheel to undergo rotation about an instant rotational center spaced below the surface of the turf, each of said tines being operative to remove a core of thatch and subsoil with the outer tapered periphery of the tubular penetrating end effecting compression of the thatch and root zone peripherally of the core during entry of said penetrating end into the turf and removal therefrom so as to prevent lifting of the turf adjacent said opening.

* * * * *